(12) United States Patent
Mori et al.

(10) Patent No.: US 8,885,126 B2
(45) Date of Patent: Nov. 11, 2014

(54) TRANSFLECTIVE LCD UNIT

(71) Applicant: NLT Technologies, Ltd., Kawasaki (JP)

(72) Inventors: Kenichi Mori, Kawasaki (JP); Michiaki Sakamoto, Kawasaki (JP); Hiroshi Nagai, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

(21) Appl. No.: 13/955,995

(22) Filed: Jul. 31, 2013

(65) Prior Publication Data

US 2013/0314654 A1  Nov. 28, 2013

Related U.S. Application Data

(62) Division of application No. 12/268,303, filed on Nov. 10, 2008, now Pat. No. 8,508,699.

(30) Foreign Application Priority Data

Nov. 8, 2007  (JP) .................................. 2007-290978

(51) Int. Cl.
*G02F 1/1335* (2006.01)
*G02F 1/1343* (2006.01)
*G02F 1/1337* (2006.01)

(52) U.S. Cl.
CPC .... *G02F 1/133555* (2013.01); *G02F 1/134363* (2013.01); *G02F 1/133707* (2013.01); *G02F 2001/134318* (2013.01)
USPC .......................................... 349/114; 349/141

(58) Field of Classification Search
CPC .................................................. G02F 1/133555
USPC ........................................ 349/114, 129, 141
See application file for complete search history.

(56) References Cited

U.S. PATENT DOCUMENTS

| 2003/0218664 A1* | 11/2003 | Sakamoto et al. ............. 347/114 |
| 2007/0002226 A1* | 1/2007 | Sakamoto et al. ............. 349/114 |
| 2007/0146591 A1* | 6/2007 | Kimura et al. ................. 349/114 |
| 2008/0100785 A1* | 5/2008 | Igeta et al. ..................... 349/114 |
| 2008/0316402 A1* | 12/2008 | Fan Jiang et al. ............. 349/114 |

FOREIGN PATENT DOCUMENTS

| CN | 1474216 A | 2/2004 |
| CN | 1802599 A | 7/2006 |
| CN | 1892349 A | 1/2007 |
| JP | 2005-338256 A | 12/2005 |
| JP | 2008-111973 A | 5/2008 |

OTHER PUBLICATIONS

SID International Symposium Digest of Techinical Papers, issued by Society for Information Display in 2007; pp. 1270-1273, vol. 38, No. 2, (p. 4, Line 21 in the specification).
Japanese Office Action dated Jul. 24, 2012 issued in counterpart Japanese Patent Application No. 2007290978.

* cited by examiner

*Primary Examiner* — Jessica M Merlin
(74) *Attorney, Agent, or Firm* — Sughrue Mion, PLLC

(57) ABSTRACT

A transflective LCD unit includes a liquid crystal (LC) layer: first and second substrates sandwiching therebetween the LC layer to define an array of pixels each including a reflective area and a transmissive area; an electrode assembly for driving the LC layer such that the LC layer in the reflective area is driven in a longitudinal-electric-field mode and the LC layer in the transmissive area is driven in a lateral-electric-field mode; and a reverse-tilt control member for controlling a reverse tilt area in which a reverse tilt of LC molecules occurs near the boundary between the reflective area and the transmissive area.

3 Claims, 16 Drawing Sheets

FIG. 8A
FIG. 8B
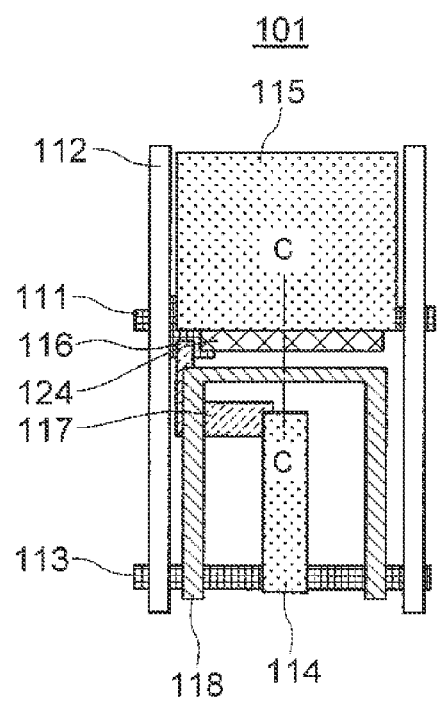
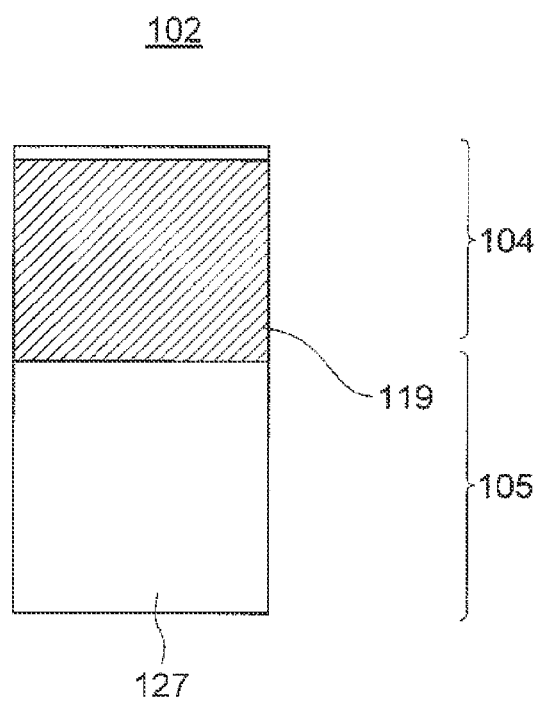

TRANSFLECTIVE LCD UNIT

CROSS REFERENCE TO RELATED APPLICATIONS

This application is a divisional of U.S. patent application Ser. No. 12/268,303, filed on Nov. 10, 2008, which claims priority to Japanese Patent Application No. 2007-290978, filed Nov. 8, 2007, the contents of all of which are incorporated herein by reference.

TECHNICAL FIELD

The present invention relates to a transflective liquid crystal display (LCD) unit and, more particularly, to a transflective LCD unit including a reflective area and a transmissive area 105 in each pixel, wherein the liquid crystal (LC) is driven by a longitudinal electric field in the reflective area, and driven by a lateral electric field in the transmissive area.

BACKGROUND ART

A transflective LCD unit which uses a lateral-electric-field mode such as an IPS (in-plane-switching) mode or a FFS (fringe-field-switching) mode is known to have an excellent viewing angle characteristic in the transmissive area. This type of transflective LCD unit is described in Patent Publication-1, for example. The transflective LCD unit described in Patent Publication-1, however, has a problem in that a satisfactory black color or dark state cannot be obtained in the reflective area even if the optical axis is adjusted therein.

Another LCD unit which uses a longitudinal-electric-field mode in the reflective area and a lateral-electric-field mode in the transmissive area is described in a Non-Patent Publication-1. In this LCD unit, the reflective area includes a built-in retardation film having a function of a λ/2 film and a λ/4 film, and a LC layer having a function of a λ/2 film, which are consecutively arranged as viewed from the light incident side toward the light emitting side of the LCD unit. In operation of the LCD unit, the light incident thereto is converted into a circularly-polarized light by the built-in retardation film, and then passes through the LC layer upon display of a dark state while maintaining the circularly-polarized state thereof, to reach a reflection film provided in the reflective area. At this stage, the LC layer is oriented in a direction normal to the substrate due to the longitudinal electric field, whereby the polarization of the light incident onto the LC layer is not changed. This prevents occurring of an insufficient black color in the reflective area, which is a significant problem in the reflective area driven by a lateral electric field. Thus, the LCD unit exhibits an excellent black color.

In the LCD unit including a reflective area driven by a longitudinal electric field, display of a dark state (black color) requires application of a voltage so that the orientation of the LC layer in the reflective area is raised by the longitudinal electric field up to a direction normal to the substrate. On the other hand, since the transmissive area has an arrangement of optical axes similar to the arrangement of optical axes in a transmissive LCD device using a lateral-electric-field mode, the transmissive area is not applied with the voltage. For achieving application of a voltage to the reflective area and absence of the applied voltage in the transmissive area, it is effective to provide two separate common electrodes in each unit pixel: one for the reflective area and the other for the transmissive area, the separate common electrodes being driven by respective drive signals having an inversion relationship therebetween. This technique is hereinafter referred to as an inverting-COM technique.

FIG. 15 shows a sectional view of a unit pixel in a transmissive LCD unit driven using the inverting-COM technique, wherein the unit pixel includes a reflective area 210 driven by a longitudinal electric field and a transmissive area 211 driven by a lateral electric field. A reflective-area pixel electrode 205 is formed on an insulating film 204 in the reflective area 210 of a TFT (thin-film-transistor) substrate 201, shown at the bottom side. On the same insulating film 204, there is provided at least one of a transmissive-area pixel electrode 206 and a transmissive-area common electrode 207 in the transmissive area 211 of the TFT substrate 201. On a counter substrate 202 opposing the TFT substrate 210 with an intervention of a LC layer 203, a reflective-area common electrode 209 is provided at the location corresponding to the location of the reflective-area pixel electrode 205, thereby overlapping the same as viewed in the direction normal to the substrate.

The LC layer 203 sandwiched between the TFT substrate 201 and the counter substrate 202 is homogeneously oriented. The reflective-area common electrode 209 and transmissive-area common electrode 206 are applied with a voltage of a rectangular waveform having a higher potential at 5V and a lower potential at zero volt, for example. The reflective-area pixel electrode 205 and transmissive-area pixel electrode 207 are connected to a data line, which supplies a signal for providing a desired electric field to the LC layer 203 of the unit pixel, via a switching device or TFT.

In the LCD unit shown in FIG. 15, the orientation of LC molecules in the reflective area must be aligned to a direction normal to the substrate, requiring application of a potential difference between the reflective-area common electrode 209 and the reflective-area pixel electrode 205. Thus, when a 0-volt signal is applied to the reflective-area common electrode 209, a 5-volt signal, for example, is applied to the reflective-area pixel electrode 205. On the other hand, an inverted signal of the signal applied to the reflective-area common electrode 209, i.e., a 5-volt signal is applied to the transmissive-area common electrode 206, due to the inverting-COM technique, and a 5-volt signal is applied to the transmissive-area pixel electrode 207 similarly to the reflective-area pixel electrode 205. Thus, there is no potential difference applied between the transmissive-area common electrode 206 and the transmissive-area pixel electrode 207, to allow the LC molecules to stay in the original orientation, whereby the transmissive area displays a dark state.

Patent Publication-1 as describe above is JP-2005-338256A (refer to paragraphs 0013-0022)

Non-Patent Publication-1 as described above is "SID INTERNATIONAL SYMPOSIUM DIGEST OF TECHNICAL PAPERS, issued by SOCIETY FOR INFORMATION DISPLAY in 2007; VOL. 38; No. 2, pp. 1270-1273.

In the LCD unit shown in FIG. 15, there is a possibility that a leakage light occurs due to disturbance of the orientation of LC molecules in the vicinity of the boundary between the reflective area and the transmissive area during display of a dark state. This is because an electric field is generated at any time between the reflective-area common electrode 209 formed on the counter substrate 202 in an area corresponding to the reflective area and the transmissive-area common electrode 206 or transmissive-area pixel electrode 207 formed on the TFT substrate 201.

FIG. 16 shows results of simulation conducted for obtaining the distribution of electric field in the LCD unit shown in FIG. 5. Reference numerals 212 and 213 denote LC molecules and isoelectric lines 213, respectively. Since the reflective-area common electrode 209 opposes the transmissive-area common electrode 206 or transmissive-area pixel electrode 207 in a slanted direction in the vicinity of the boundary between the reflective area 210 and the transmissive area 211 with an intervention of the LC layer 203, LC molecules 212 in the LC layer 203 near the reflective-area common electrode 209 are applied with an electric field slanted with respect to the substrate, i.e., slanted in the direction to downward right as shown by the optical axis of LC molecules 212 in FIG. 16. The slanted electric field causes a reverse tilt in a portion of the reflective area 210 in the vicinity of the boundary, thereby generating a leakage light. The leakage light raises the luminance (black luminance) in the reflective area 210 during display of a dark state, thereby degrading the contrast ratio and visibility of the LCD unit.

SUMMARY OF THE INVENTION

In view of the above, it is an object of the present invention to provide a transflective LCD unit which is capable suppressing the leakage light in the vicinity of the boundary between the reflective area and the transmissive area.

The present invention provides a transflective liquid crystal display (LCD) unit comprising: a liquid crystal (LC) layer: first and second substrates sandwiching therebetween the LC layer to define an array of pixels in the LC layer, the pixels each including a reflective area and a transmissive area; an electrode assembly for driving the LC layer such that the LC layer in the reflective area is driven in a longitudinal-electric-field mode and the LC layer in the transmissive area is driven in a lateral-electric-field mode; and a reverse-tilt control member disposed in a vicinity of a boundary between the reflective area and the transmissive area for controlling a reverse tilt area in which a reverse tilt of LC molecules occurs in the LC layer.

The above and other objects, features and advantages of the present invention will be more apparent from the following description, referring to the accompanying drawings.

BRIEF DESCRIPTION OF THE DRAWINGS

FIGS. 8A and 8B are top plan views of the TFT substrate and the counter substrate, respectively, in a transflective LCD unit according to a third embodiment of the present invention.

EXEMPLARY EMBODIMENTS

Figure 1A:
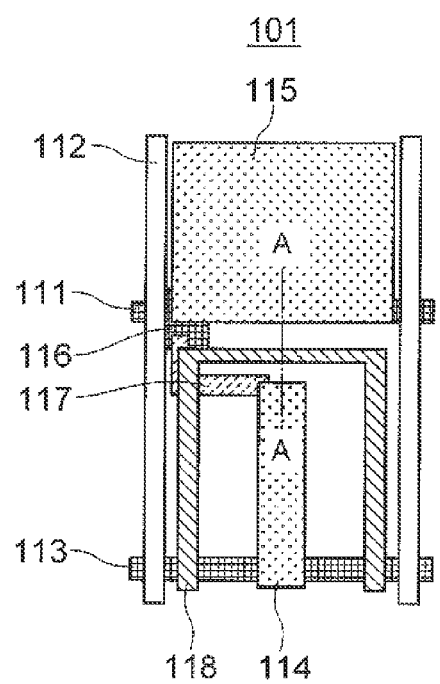
FIGS. 1A and 1B are top plan views of the TFT substrate and the counter substrate, respectively, in a transflective LCD unit according to a first embodiment of the present invention.

Now, exemplary embodiments of the present invention will be described with reference to accompanying drawings, wherein similar constituent elements are designated by similar reference numerals.

Figure 1B:
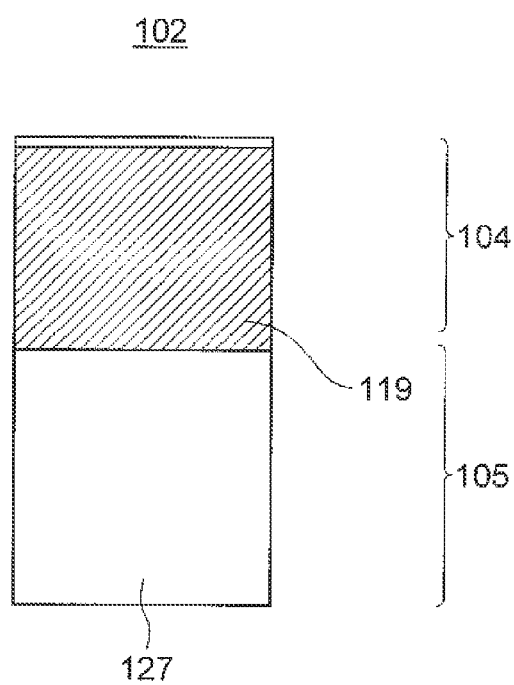
Figure 2:
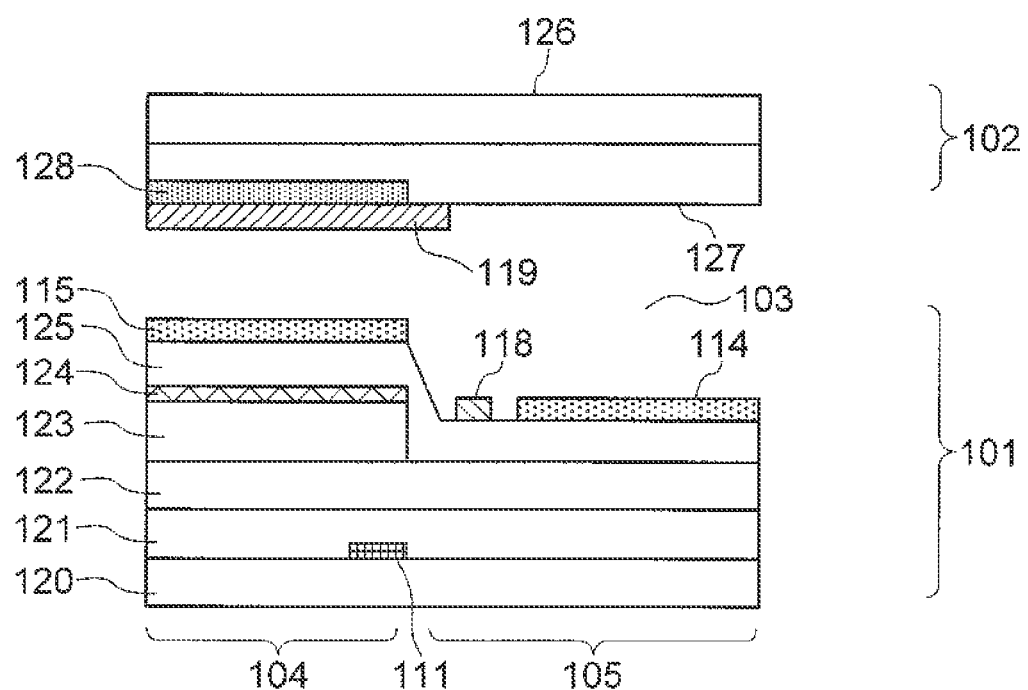
FIG. 2 is a sectional view of a unit pixel of the LCD unit of the first embodiment, showing a vicinity of the boundary between the reflective area and the transmissive area.

FIGS. 1A and 1B show, in a top plan view, the TFT substrate and counter substrate, respectively, in a transflective LCD unit according to a first embodiment of the present invention. FIG. 2 shows the transflective LCD unit of FIG. 1 in a sectional view. The transflective LCD unit of the present embodiment includes a reflective area 104 and a transmissive area 105 in each unit pixel, wherein the LC layer 103 in the reflective area 104 is driven in a longitudinal-electric-field mode and the LC layer in the transmissive area 105 is driven in a lateral-electric-field mode. An array of unit pixels are arranged in a matrix over the entire screen area of the LCD unit.

The TFT substrate 101 and the counter substrate 102 oppose each other with an intervention of the LC layer 103. The unit pixel is defined by adjacent two scanning lines 111 extending in the row direction and adjacent two data lines 112 extending in the column direction. The transflective LCD unit of the present embodiment may be used as a display unit in a cellular phone, portable digital assistant (PDA) etc.

The TFT substrate 101 includes a glass substrate (transparent substrate) 120 and a layer structure formed thereon for driving the unit pixels for display of an image on the screen. The layer structure formed on the TFT substrate 101 includes the scanning lines 111 for delivering a scanning signal or gate signal, the data lines 112 for receiving a data signal, a transmissive-area common electrode line 113 for receiving a reference potential used in the transmissive area 105, transmissive-area common electrodes 118 connected to the transmissive-area common electrode line 113, pixel electrodes including transmissive-area pixel electrodes 114 and reflective-area pixel electrodes 115 for applying a desired electric field to the LC layer 103, and an array of TFT (switching devices) 116 each disposed for a corresponding one of the unit pixels. Although not illustrated in FIGS. 1A and 1B, there is provided an orientation film on the inner surface of the TFT substrate 101, or the interface of the TFT substrate 101 with respect to the LC layer 103.

Each TFT 116 is provided in the vicinity of an intersection of a corresponding scanning line 111 and a corresponding data line 112. The TFT 116 includes a gate electrode, a drain electrode, a source electrode, and an amorphous silicon layer. The gate electrode is connected to the scanning line 111, and the drain electrode is connected to the data line 112. The source electrode 117 is connected to both the transmissive-area pixel electrode 114 and reflective-area pixel electrode 115.

The scanning lines 111 and transmissive-area common electrode lines 113 are formed on the glass substrate 120, and a first insulating film 121 is formed thereon. The data lines 112, and drain electrode, source electrode and amorphous silicon layer of the TFTs 116 are formed on the first insulating film 121, and a second insulating film 122 is formed thereon. An uneven film 123 having convex and concave portions in the reflective area 104 is formed on the second insulating film 122. A reflection film 124 having a function for diffusing an incident light while reflecting the same is formed on the uneven film 123. The reflection film 124, which is formed on the uneven film 123, has an uneven surface. A planarization film 125 is formed on the reflection film 124 in both the reflective area 104 and transmissive area 105.

The uneven film 123 and planarization film 125 have an additional function of differentiating the thickness of the LC layer 103 between the transmissive area 105 and the reflective area 104 by controlling the thickness of the uneven film 123 and planarization film 125 so that the LC layer 103 in the respective areas have a desired thickness. In the reflective area 104, the reflective-area pixel electrode 115 is formed from a conduction material, such as ITO (indium tin oxide), on the planarization film 125. In the transmissive area 105, the transmissive-area pixel electrode 114 and transmissive-area common electrode 118 are formed from a similar material, such as ITO. The transmissive-area common electrode 118 on the planarization film 125 and the transmissive-area common electrode line 113 on the insulating film 121 are electrically connected together. The transmissive-area common electrode 118 and transmissive-area pixel electrode 114, which are formed in the transmissive area 105, extend parallel to each other in the extending direction of the data line 112. The LC layer 103 is driven in a lateral-electric-field mode in the transmissive area 105 by the electric field occurring between the transmissive-area common electrode 118 and the transmissive-area pixel electrode 114, which are formed on the TFT substrate 101.

The counter substrate 102 includes a glass substrate 126, and a layer structure formed on the surface thereof near the LC layer 103. The layer structure includes a black-matrix layer having a light shielding function, color filter layers partially overlapping the black matrix layer, a built-in retardation film 128 having a function of converting the light incident onto the LCD unit into a desired polarized state, a transparent planarization film 127, the reflective-area common electrode 119, and an alignment film, which are arranged in this order toward the LC layer 103.

The counter substrate 102 includes the built-in retardation film 128 and reflective-area common electrode 119 in an area corresponding to the reflective area 104. The reflective-area common electrode 119 is configured by a transparent conductive material, such as ITO. The reflective-area common electrode 119 is located to oppose the reflective-area pixel electrode 115 formed on the TFT substrate 101. The reflective-area common electrode 119 laterally protrudes from the boundary between the reflective area 104 and the transmissive area 105 toward the transmissive area 105. The protruding portion or extension of the reflective-area common electrode 119 configures a reverse-tilt control member that controls the area (reverse tilt area) in which the reverse tilt is generated in the vicinity of the boundary between the reflective area 104 and the transmissive area 105, and allows the reverse tilt area to be restricted within the transmissive area 105 which is driven in the lateral-electric-field mode. The length of extension of the reflective-area common electrode 119 is preferably not less than 1.5 micrometers.

In the LCD unit of the present embodiment, the transmissive-area common electrode 118 and reflective-area common electrode 119 are applied with drive signals having an inversion relationship therebetween, whereas the transmissive-area pixel electrode 114 and reflective-area pixel electrode 115, which are connected to the same common data line 112, are applied with the same drive signal. For example, an arbitrary signal, which is in a range of 0V-5V, is fed in common to the transmissive-area pixel electrode 114 and reflective-area pixel electrode 115. When a 0-volt signal is applied to the reflective-area pixel electrode 115 and a 5-volt signal is applied to the reflective-area common electrode 119, the potential difference between the reflective-area pixel electrode 115 and the reflective-area common electrode 119 is 5V at the maximum, whereby the LC layer 103 in the a reflective area 104 is driven by a longitudinal electric field that is generated by the potential difference of 5 volts.

A linearly-polarized light incident onto the LCD unit and passed by a polarizing film (not shown) disposed on the light incidence surface of the counter substrate 102 passes through the built-in retardation film 128 installed in the reflective area 104 to be converted into a clockwise-circularly-polarized light, for example. The clockwise-circularly-polarized light passes through the LC layer 103 to reach the reflection film 124. At this stage, the optical axis of the LC molecules in the reflective area 104 is driven into a direction normal to the substrate by the longitudinal electric field between the reflective-area pixel electrode 115 and the reflective-area common electrode 119, whereby the LC layer 103 does not have a birefringence and thus allows the incident light to reach the reflection film 124 with the polarized state being unchanged.

The light incident onto the reflection film 124 as a clockwise-circularly-polarized light is converted by the reflection film 124 into a counterclockwise-circularly-polarized light, and passes through the LC layer 103 in the reverse direction with the polarized state thereof being unchanged, to reach the built-in retardation film 128 as a counterclockwise-circularly-polarized light. The counterclockwise-circularly-polarized light is passed by the built-in retardation film 128 to assume a linearly-polarized light having an optical axis perpendicular to the optical axis of the original light incident from the polarizing film to the built-in retardation film 128. The light passed by the built-in retardation film 128 has an optical axis perpendicular to the light transmission axis of the polarizing film, whereby the light is blocked by the polarizing film and the reflective area 104 displays a dark state.

On the other hand, the transmissive-area common electrode 118 is applied with a common signal having an inversion relationship with respect to the common signal applied to the reflective-area common electrode 119. More specifically, a 0-volt signal is applied to the transmissive-area common electrode 118. Since a 0-volt drive signal, which is equipotential to the drive signal applied to the reflective-area pixel electrode 115, is applied to the transmissive-area pixel electrode 114, there occurs no potential difference between the transmissive-area pixel electrode 114 and the transmissive-area common electrode 118 in the transmissive area 105. Thus, the LC layer in the transmissive area 105 maintains the initial orientation defined by the orientation film. It is to be noted that the initial orientation of the LC layer defined by the orientation film is parallel or normal to the light transmission axis of the polarizing film disposed on the rear side of the LCD unit, which is the side near the backlight source.

The backlight incident onto the rear surface of the TFT substrate 101 that is far from the LC layer 103 is converted into a linearly-polarized light by another polarizing film that is disposed between the TFT substrate 101 and the backlight source (not shown). Since the LC molecules have an orientation parallel or normal to the light transmission axis of the another polarizing film, the light passed by the another polarizing film passes through the LC layer 103 with the polarized state thereof being unchanged. Since the polarizing film disposed on the light emitting side of the counter substrate 102 has a light transmission axis normal to the light transmission axis of the another polarizing film disposed on the rear side of the TFT substrate 101, the light passed by the LC layer 103 cannot pass through the polarizing film disposed on the light emitting side whereby the transmissive area 105 displays a dark state as well.

Upon display of the dark state, the LC molecules are aligned in the direction normal to the substrate in the reflective area 104 and parallel to the substrate in the transmissive area 105. Since a 0-volt signal is applied to the transmissive-area common electrode 118 when the reflective-area common electrode 119 is applied with 5V, for example, a slanted electric field is generated in the vicinity of the boundary between the reflective area 104 and the transmissive area 105 due to the potential difference between the reflective-area common electrode 119 and the transmissive-area common electrode 118. Since the area (slanted-electric-field area) in which the slanted electric field is generated resides in the reflective area 104 near the boundary, there arises an inconsistency between the orientation of the LC molecules generated by the slanted electric field and the orientation of the LC molecules caused by the longitudinal electric field in the reflective area 104.

In the present embodiment, a portion of the reflective-area common electrode 119 in the vicinity of the boundary between the reflective area 104 and the transmissive area 105 laterally protrudes from the reflective-area pixel electrode 115 toward the transmissive area 105. This configuration deviates the slanted-electric-field area away from the reflective area 104 across the boundary. That is, the slanted electric field is suppressed within the reflective area 104 near the boundary thereof with respect to the transmissive area 105, thereby suppressing disturbance of the orientation of the LC molecules caused by the slanted electric field. This improves alignment of the orientation of LC molecules in the reflective area 104. The deviation of the slanted-electric-field area away from the reflective area 104 toward the transmissive area 105 causes a shift of the reverse tilt area toward the transmissive area 105 across the boundary, thereby suppressing the leakage light occurring in the reflective area 104.

Figure 3:
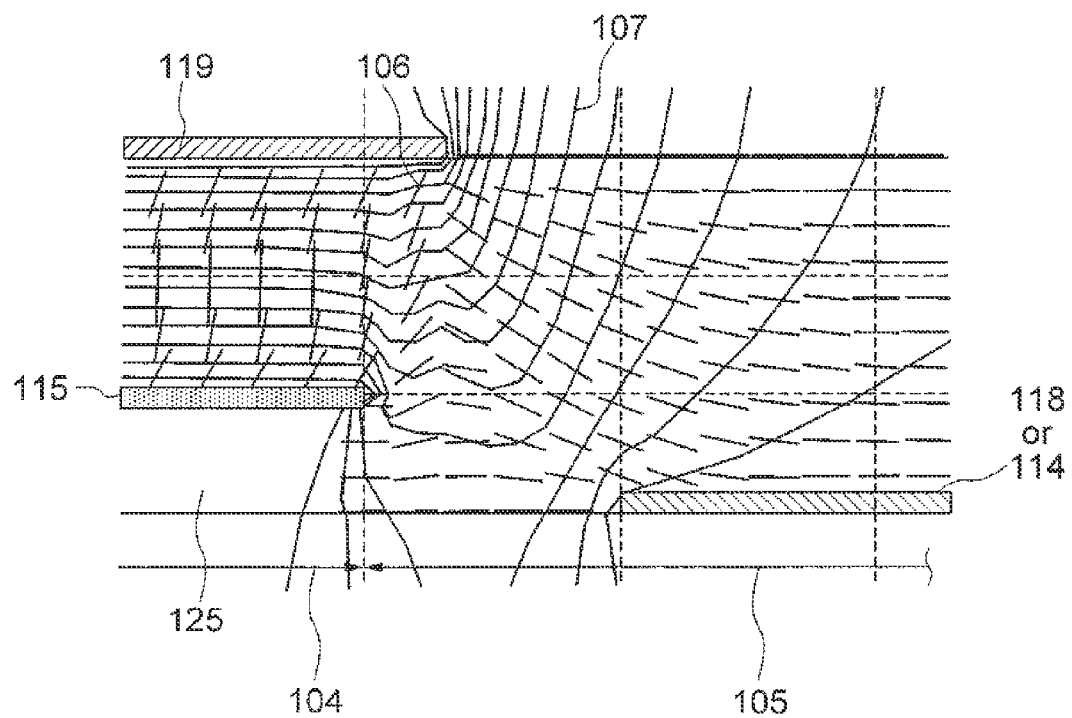
FIG. 3 is a schematic diagram showing the electric field distribution obtained by simulation in the LCD unit of FIG. 2.

FIG. 3 shows results of simulation conducted for obtaining the electric field distribution in the LCD unit of FIG. 2. In FIG. 3, reference numerals 106 and 107 denote LC molecules and isoelectric lines, respectively. Generally, in a LC panel, direction of the orientation treatment of the TFT substrate 101 and direction of the orientation treatment of the counter substrate 102 are opposite from each other. This suppresses the reverse tilt caused by application of an electric field to the LC molecules to change the orientation of LC molecules. In the LCD unit shown in FIG. 3, the orientation treatment for the TFT substrate 101 is performed from the left toward the right in the figure whereas the orientation treatment in the counter substrate 102 is performed from the right toward the left in the figure. Thus, the LC molecules 106 in the vicinity of the TFT substrate 101 have a tilt directed to the upward right as viewed from the TFT substrate 101 in FIG. 3 whereas the LC molecules 106 in the vicinity of the counter substrate 102 have a tilt directed to downward left as viewed from the counter substrate 102 in FIG. 3.

Figure 16:
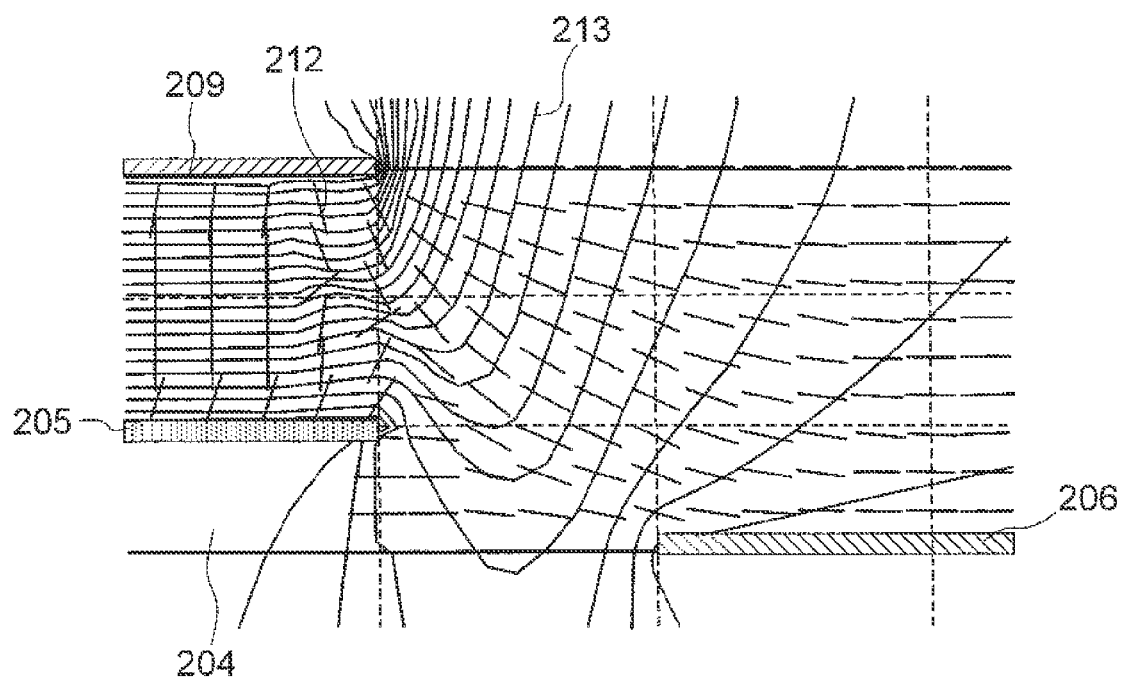
FIG. 16 is a schematic diagram showing the electric field distribution of the LCD unit of FIG. 15.

If the reflective-area common electrode 119 formed on the counter substrate 102 has no extension protruding across the boundary toward the transmissive area 105, a strong slanted electric field is generated in the vicinity of the reflective-area common electrode 119 near the boundary, as shown in FIG. 16. This slanted electric field generates a reverse tilt having a direction opposite to the direction of the tilt defined by the orientation treatment of the counter substrate 102, i.e., a reverse tilt having a direction directed to downward right. In a part of the reflective area 104 which is well apart from the boundary and in which an upward right tilt is generated on the TFT substrate 101 and a downward left tilt is generated on the counter substrate 102, the tilt of the LC molecules 106 is aligned over the substantially entire area of the LC layer 103. However, in the vicinity of the boundary, a portion of the LC layer 103 near the TFT substrate 101 and counter substrate 102 has a tilt reverse to the tilt of the other portion of the LC layer 103, whereby the orientation of the LC layer 103 is disturbed in the portion near the boundary.

The transflective LCD unit according to the present embodiment has the basic configuration of the present invention wherein the LCD unit includes: a LC layer: first and second substrates sandwiching therebetween the LC layer to define an array of pixels in the LC layer, the pixels each including a reflective area and a transmissive area; an electrode assembly for driving the LC layer such that the LC layer in the reflective area is driven in a longitudinal-electric-field mode and the LC layer in the transmissive area is driven in a lateral-electric-field mode; and a reverse-tilt control member disposed in a vicinity of a boundary between the reflective area and the transmissive area for controlling a reverse tilt area in which a reverse tilt of LC molecules occurs in the LC layer.

According to the basic configuration used in the LCD unit of the present invention, the reverse-tilt control member controls the reverse tilt area, thereby suppressing the leakage light caused by the reverse tilt in the reflective area upon display of a dark state in the LCD unit.

In more detail, the reflective-area common electrode 119 has an extension protruding across the boundary between the reflective area 104 and the transmissive area 105 toward the transmissive area 105. As understood from FIG. 3, due to the slanted electric field being shifted from the boundary between the reflective area 104 and the transmissive area 105 toward the transmissive area 105, the area in which the downward right tilt occurring in the vicinity of the counter substrate 102 is deviated toward the transmissive area 105 in the present embodiment. The transmissive area 105 is driven in a lateral-electric-field mode, and thus the LC molecules 106 in the transmissive area 102 in the vicinity of the extension on the TFT substrate 101 are not tilted toward the direction normal to the TFT substrate 101. Accordingly, a reverse tilt of the downward right direction which is shifted toward the transmissive area 105 in the vicinity of the counter substrate 102 will not be recognized as a leakage light in the reflective area 104. Since the slanted electric field is not generated in the vicinity of boundary in the reflective area 104, the tilt defined by the orientation treatment of the counter substrate 102 is maintained whereby the reverse tilt is not generated in both the vicinity of the TFT substrate 101 and counter substrate 102. Thus, the orientation of the LC molecules 106 in the vicinity of boundary in the reflective area 104 is aligned, thereby suppressing the leakage light caused by the reverse tilt and providing an excellent dark state.

Figure 4:
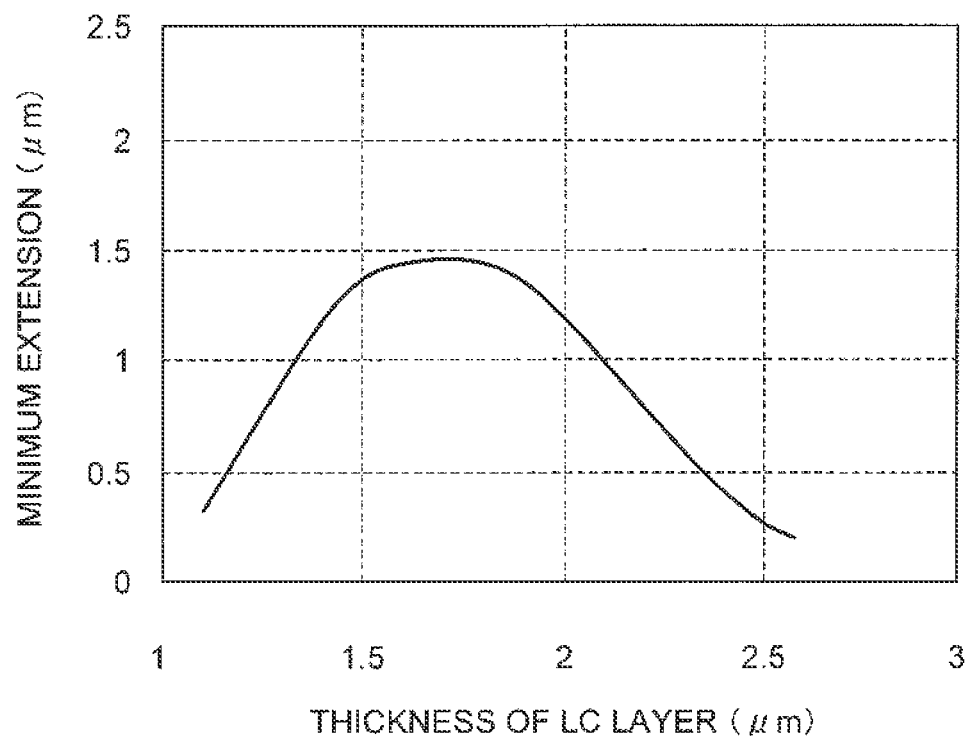
FIG. 4 is a graph showing the relationship between the thickness of the LC layer in the reflective area and the minimum extension that prevents generation of the reverse tilt.

FIG. 4 shows the relationship between the thickness of the LC layer 103 in the reflective area 104 and the minimum extension (length) that effectively suppresses the reverse tilt.

The minimum extension that achieves suppression of the reverse tilt increases when the thickness of the LC layer 103 increases toward a thickness range of 1.4 to 2.0 micrometers, and then decreases when the thickness increases from the above thickness range. This reveals that an extension of 1.5 micrometers or above is preferable in order for achieving the reverse tilt without depending on the thickness of the LC layer 103. On the other hand, if the thickness of the LC layer 103 is as small as 1.3 micrometers or less, the extension is preferably 1 micrometer or more.

A preferable extension will be described hereinafter. As understood from FIG. 3, since the reflective-area common electrode 119 has an extension protruding toward the transmissive area 105, the slanted electric field is shifted toward transmissive area 105, and at the same time, an upward right electric field is generated from the end of reflective-area pixel electrode 115 toward the end of reflective-area common electrode 119. The direction of the upward right electric field is aligned with a direction that maintains the tilt defined by the orientation treatment of the TFT substrate 101, whereby the upward right electric field thus generated suppresses the reverse tilt as well.

The slanted-electric-field area in which the upward right electric field is generated relates to the length of extension with respect to the thickness of the LC layer 103 in the reflective area 104. That is, an extension that is below a specific length cannot achieve suppression of the reverse tilt. Accordingly, as shown in FIG. 4, a thickness of the LC layer 103 as small as 1.2 micrometers, for example, accepts a smaller length of extension, as understood from FIG. 4. It is to be noted that a thickness of the LC layer as large as 2.4 micrometers also accepts a small length of extension as understood from FIG. 4. However, this results from another factor. More specifically, the slanted electric field that generates the reverse tilt is strongest in the vicinity of the boundary on the reflective-area common electrode 119, and gradually decreases toward the TFT substrate 101. A larger thickness of the LC layer 103 in the reflective area 104 reduces the slanted-electric-field area with respect to the thickness of the LC layer 103, and increases the area of the longitudinal electric field, thereby suppressing the reverse tilt.

Figure 5A:
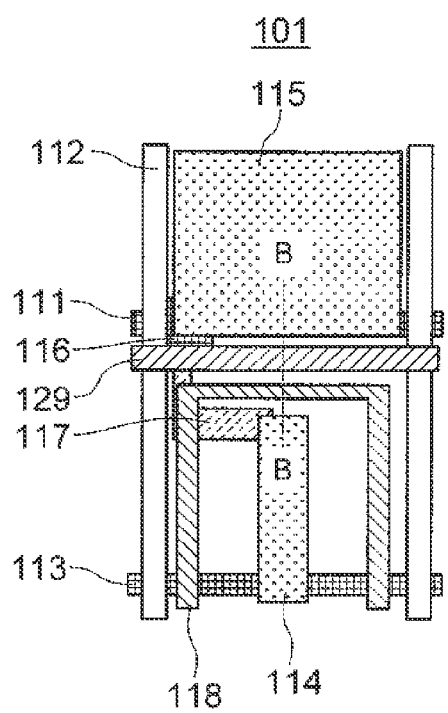
FIGS. 5A and 5B are top plan views of the TFT substrate and the counter substrate in a transflective LCD unit according to a second embodiment of the present invention.
Figure 5B:
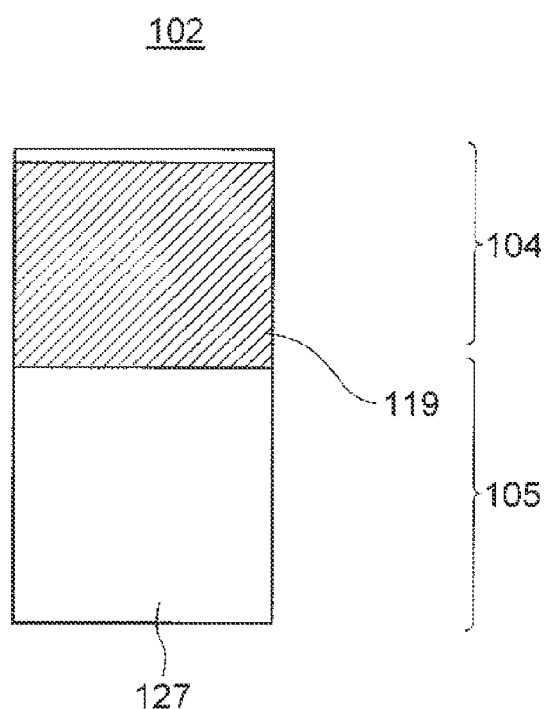
Figure 6:
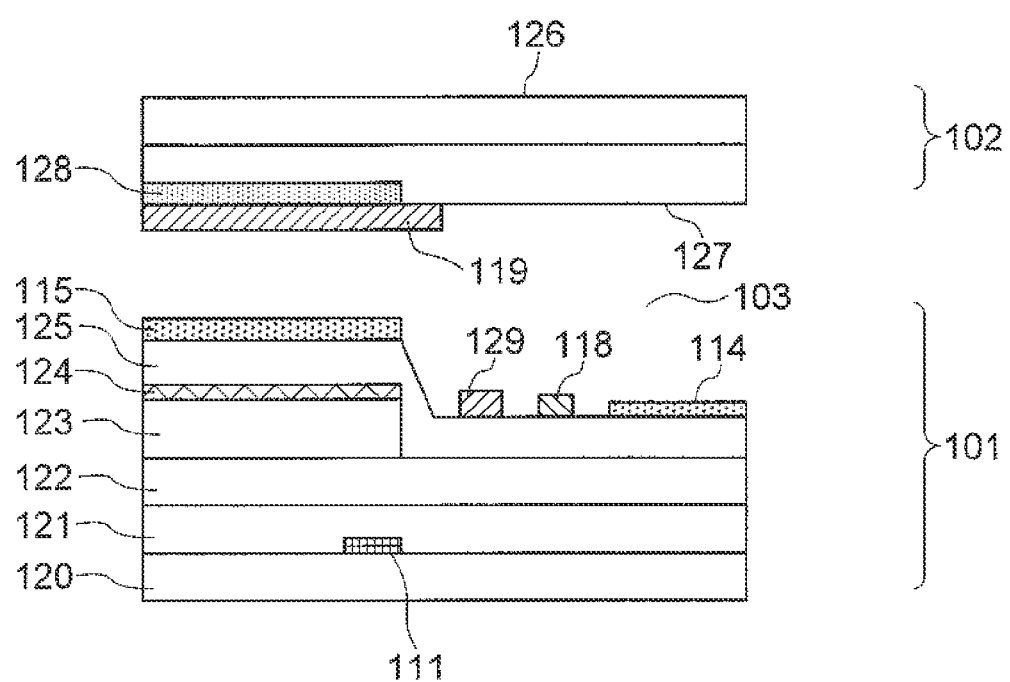
FIG. 6 is a sectional view of a unit pixel of the LCD unit of the second embodiment, showing a vicinity of the boundary between the reflective area and the transmissive area.

A LCD unit according to a second exemplary embodiment of the present invention will be described hereinafter. FIGS. 5A and 5B show the TFT substrate 101 and counter substrate 102, respectively, of the LCD unit in a top plan view, and FIG. 6 shows a sectional view taken along line B-B in FIG. 5A. The LCD unit of the present embodiment is similar to the LCD unit of the first embodiment except that a subsidiary electrode 129 having a potential equal to the potential of the reflective-area common electrode 119 is formed on the TFT substrate 101. Although the reflective-area common electrode 119 formed on the counter substrate 102 has an extension protruding toward the transmissive area 105 similarly to the first embodiment, the reflective-area common electrode 119 need not have an extension toward the transmissive area 105.

In the present embodiment, when the reflective-area pixel electrode 115, transmissive-area common electrode 118, and transmissive-area pixel electrode 114 are formed on the planarization film 125, the subsidiary electrode 129 which extends along the boundary between the reflective area 104 and the transmissive area 105 is formed. That is, the reflective-area pixel electrode 115, subsidiary electrode 129, and transmissive-area electrodes 118, 114 are arranged in parallel in this order from the reflective area 104 toward the transmissive area 105, as viewed from the counter substrate 102. The order of the transmissive-area electrodes 118 and 114 may be selected as desired. The subsidiary electrode 129 is electrically connected to a common electrode line that supplies a common electrode signal to the reflective-area common electrode 119 on the counter substrate 102 outside the display area. The subsidiary electrode 129 configures a reverse-tilt control member that controls the reverse tilt area in the vicinity of the boundary between the reflective area 104 and the transmissive area 105. More specifically, the subsidiary electrode 129 controls the reverse tilt area within the vicinity of the counter substrate 102.

The subsidiary electrode 129 need not be formed on the planarization film 125, and may be formed on the glass substrate 120. In this case, the subsidiary electrode 129 may be formed to extend parallel to the boundary on the glass substrate 120 in the step of forming the scanning lines 111 on the glass substrate 120. In such a case either, the subsidiary electrode 129 is connected to the common electrode line for supplying a common signal to the reflective-area common electrode 119 on the counter substrate 102 outside the display area of the LCD unit. In order to form the subsidiary electrode 129 overlapping the source electrode 117 in the reflective area 104 with an intervention of the insulating film 121, the subsidiary electrode 129 may have an extension protruding toward the reflective area 104. The subsidiary electrode 129 may be formed on the insulating film 121 or insulating film 122.

Again in the present embodiment, upon driving the LC layer 103 in the reflective area 104, when a 0-volt signal, for example, is applied to the reflective-area pixel electrode 115, a 5-volt signal is applied to the reflective-area common electrode 119. The subsidiary electrode 129 formed on the TFT substrate 101 along the boundary is applied with the same signal applied to the reflective-area common electrode 119, whereby there arises a potential difference between the reflective-area pixel electrode 115 and the subsidiary electrode 129 on the TFT substrate 101. In this configuration, the electric field generated in the vicinity of the boundary between the reflective area 104 and the transmissive area 105 weakens the slanted electric field in the vicinity of the boundary, thereby preventing the orientation of the LC molecules from being disturbed by the slanted electric field. The above electric field also intensifies the electric field applied from the end of reflective-area pixel electrode 115 in the vicinity of the boundary, suppressing the reverse tilt area to prevent the leakage light in the reflective area 104 upon display of a dark state.

Figure 7:
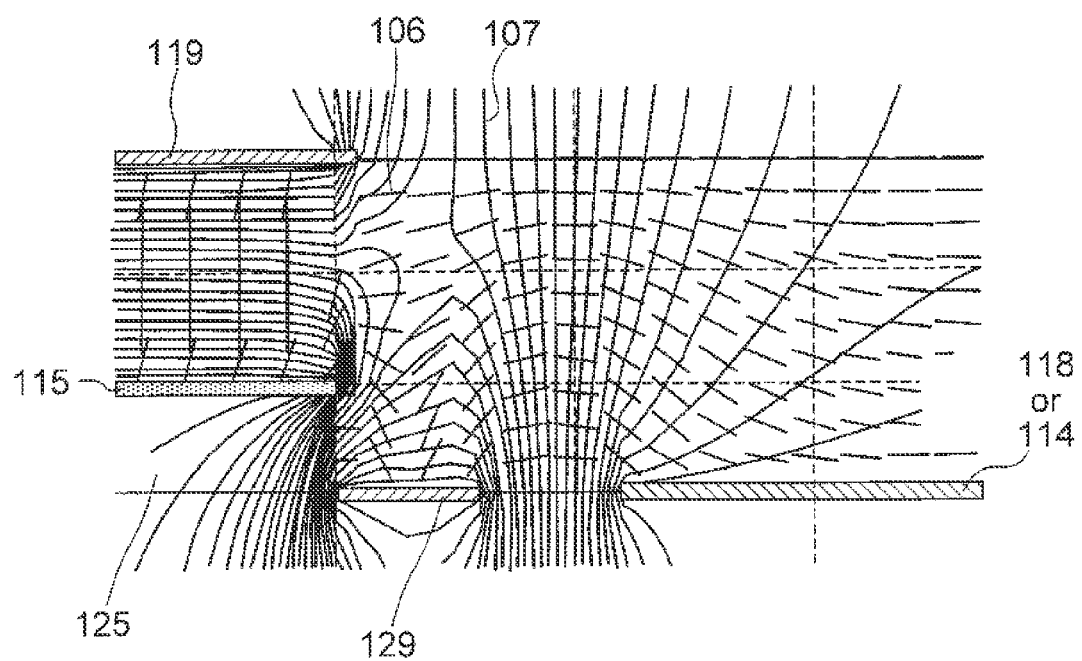
FIG. 7 is a schematic diagram showing the electric field distribution obtained by simulation in the LCD unit of FIG. 6.

FIG. 7 shows results of simulation conducted for obtaining the electric field distribution in the LCD unit of the present embodiment. The subsidiary electrode 129 formed in the vicinity of the boundary generates a potential difference between the reflective-area pixel electrode 115 and the subsidiary electrode 129, as well as a potential difference between the subsidiary electrode 129 and the transmissive-area common electrode 118 or transmissive-area pixel electrode 114. With reference to FIG. 7, it will be understood that the isoelectric lines are density between the transmissive-area common electrode 118 and the subsidiary electrode 129 and between the reflective-area pixel electrode 115 and the subsidiary electrode 129, and that a strong electric field is generated therebetween. Since almost all the electric lines of force exiting the transmissive-area common electrode 118 ends on the subsidiary electrode 129, the slanted electric field occurring between the transmissive-area common electrode 118 and the reflective-area common electrode 119 is suppressed to a sufficiently lower level. The suppression of the slanted electric field in the vicinity of the boundary restricts the reverse tilt area, wherein a tilt of LC molecules reverse to the tilt defined by the orientation treatment of the LC molecules on the counter substrate 102 is generated, to a limited area in the vicinity of the counter substrate 102.

The electric field between the reflective-area pixel electrode 115 and the subsidiary electrode 129 has a function of intensifying the electric field generated from the end of reflective-area pixel electrode 115 in the vicinity of the boundary. The electric field occurring from the end of reflective-area pixel electrode 115 in the vicinity of the boundary has the same direction as the upward right tilt of the LC molecules defined by the orientation treatment of the TFT substrate 101, and considerably enters the LC layer 103 in the reflective area 104 near the boundary from the TFT substrate 101. That is, the area of the LC layer 103 in which the LC molecules tilt appropriately in the vicinity of the boundary is increased to prevent the reverse tilt. It is to be noted in the first embodiment that the slanted electric field causing the reverse tilt is shifted from the boundary toward the transmissive area 105. On the other hand, the present embodiment provides a function of weakening the slanted electric field itself. In particular, the present embodiment assists the function of the first embodiment wherein the reverse tilt may occur if the slanted-electric-field area is located excessively near the boundary.

In addition, the present embodiment has a configuration wherein the reflective-area common electrode 119 has an extension protruding toward the transmissive area 105 on the counter substrate 102 and the subsidiary electrode 129 which is equipotential with the reflective-area common electrode 119 is formed on the counter substrate 102. This configuration suppresses the change of slanted electric field in the vicinity of the boundary, which may be caused by deviation of the counter substrate 102 with respect to the TFT substrate 101 during bonding together both the substrates. More specifically, if the LCD unit is designed so that the reflective-area common electrode 119 and the reflective-area pixel electrode 115 precisely overlap each other and in fact there is a deviation therebetween, the end of reflective-area common electrode 119 may protrude from the end of reflective-area pixel electrode 115 toward the center of the reflective area 104. In this case, irrespective of whether or not the subsidiary electrode 129 is provided, there occurs the problem of a reverse tilt in the reflective area 104 near the boundary. Such a problem will be solved however by a design of the LCD unit in the present embodiment wherein the reflective-area common electrode 119 on the counter substrate 102 is designed to have an extension protruding toward the transmissive area 105, and the extension thereof is equal to the width of the expected maximum deviation.

In the configuration of the first embodiment, the extension must be longer than the expected maximum deviation in order to ensure the suppression of reverse tilt caused by the deviation between the substrates. This configuration may involve a reduction of the effective opening ratio of the pixel by an amount corresponding to the longer extension of the reflective-area common electrode toward the transmissive area 105. The term effective opening ratio is a ratio of the effective display area of the pixel to the total pixel area including a shielded area in the pixel. The first embodiment is effective to suppression of the slanted electric field caused by the deviation between the substrates. In this respect, the present embodiment is effective to the slanted electric field caused by the deviation as well as other factors and thus achieves a stable suppression of the reverse tilt. In addition, there is another advantage that if the subsidiary electrode 129 is formed on the glass substrate 120 and overlaps the source electrode 117 in the reflective area 104, the overlapping portion may act as an auxiliary capacitor for the reflective area 104.

Figure 9:
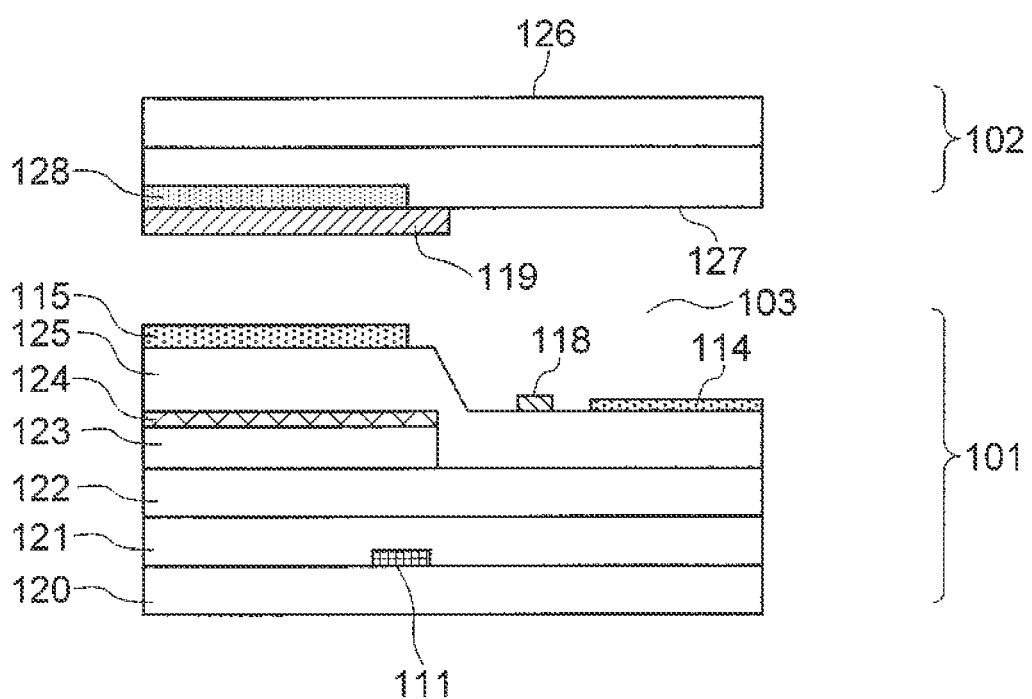
FIG. 9 is a sectional view of a unit pixel in the LCD unit of the third embodiment, showing a vicinity of the boundary between the reflective area and the transmissive area.

A LCD unit according to a third embodiment of the present invention will be described hereinafter. FIGS. 8A, 8B and 9 show the LCD unit of the present embodiment similarly to FIGS. 5A, 5B and 6, respectively. The LCD unit of the present embodiment is similar to the LCD unit of the first embodiment except that the reflection film 124 protrudes from the reflection-area pixel electrode 115 toward the transmissive area 105. In other words, the reflection film 124 has an extension protruding beyond the reflection-area pixel electrode 115 toward the transmissive area 105 as observed from the counter substrate 102. The reflection film 124 is electrically connected to a common electrode line outside the display area, the common-electrode line supplying a common electrode signal to the reflective-area common electrode 119 on the counter substrate 102. Although the reflective-area common electrode 119 on the counter substrate 102 has an extension protruding toward the transmissive area 105 in the present embodiment, it is not necessary for the reflective-area common electrode 119 to have the extension.

The present embodiment uses the reflection film 124 as a reverse-tilt control member that controls the reverse tilt area generated in the vicinity of the boundary between the reflective area 104 and the transmissive area 105, and restricts the reverse tilt area to the vicinity of the counter substrate 102. Since the reflection film 124 receives the same signal as that supplied to the reflective-area common electrode 119, there arises a potential difference between the reflection film 124 and the reflective-area pixel electrode 115 upon driving the LC layer 103 by applying a potential difference between the reflective-area pixel electrode 15 and the reflective-area common electrode 119. Since the reflection film 124 overlaps the reflective-area pixel electrode 115 with an intervention of the planarization film 125 therebetween, a longitudinal electric field is generated in the overlapping portion. In addition, in the vicinity of the extension of the reflection film 124 protruding toward the transmissive area 105 beyond the reflective-area pixel electrode 115, a potential difference is generated between the reflective-area pixel electrode 115 and the reflection film 124 and between the reflection film 124 and the transmissive-area common electrode 118 or transmissive-area pixel electrode 114, similarly to the second embodiment. The thus generated potential difference weakens the slanted electric field in the vicinity of the boundary, thereby suppressing the disturbance of the orientation of the LC molecules caused by the slanted electric field in the reflective area 104 near the boundary.

Figure 10:
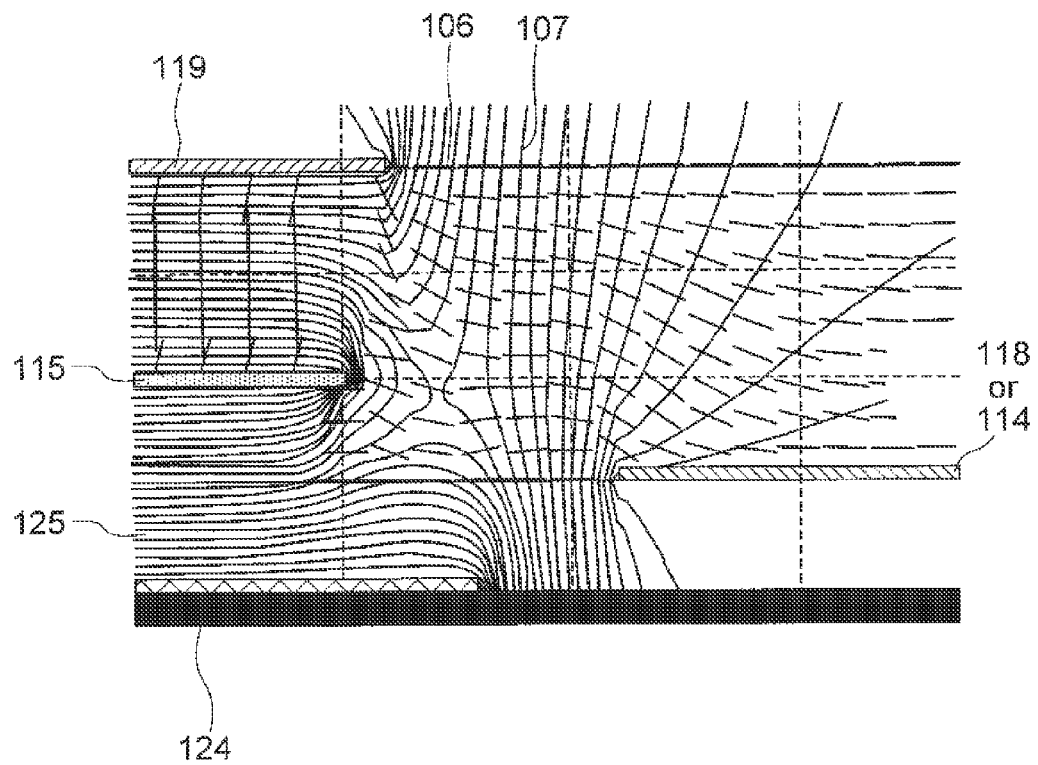
FIG. 10 is a schematic diagram showing the electric field distribution obtained by simulation in the LCD unit of FIG. 9.

FIG. 10 shows results of simulation conducted for obtaining the electric field distribution in the LCD unit having the configuration shown in FIG. 9. When the reflection film 124 having an extension protruding toward the transmissive area 105 is applied with the same signal as that applied to the reflective-area common electrode 119, there occurs a potential difference between the extension and the reflective-area pixel electrode 115 and between the extension and the transmissive-area common electrode 118 or transmissive-area pixel electrode 114, similarly to the second embodiment. More specifically, the extension of reflection film 124 has a function similar to the function of subsidiary electrode 129 (FIG. 6) in the second embodiment, and thus achieve a similar advantage. In addition, since the reflective film 124 is applied with the same signal as that applied to the reflective-area common electrode 119, the overlapping portion of the extension and the reflective-area pixel electrode 115 acts as a subsidiary capacitor for the reflective area 104, with the planarization film 125 being a capacitor insulation film.

Figure 11A:
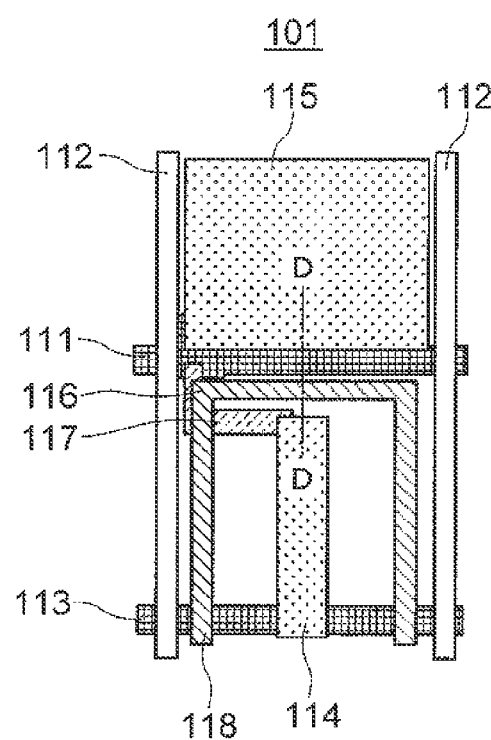
FIGS. 11A and 11B are top plan views of the TFT substrate and the counter substrate, respectively, in a LCD unit according to a fourth embodiment of the present invention.
Figure 11B:
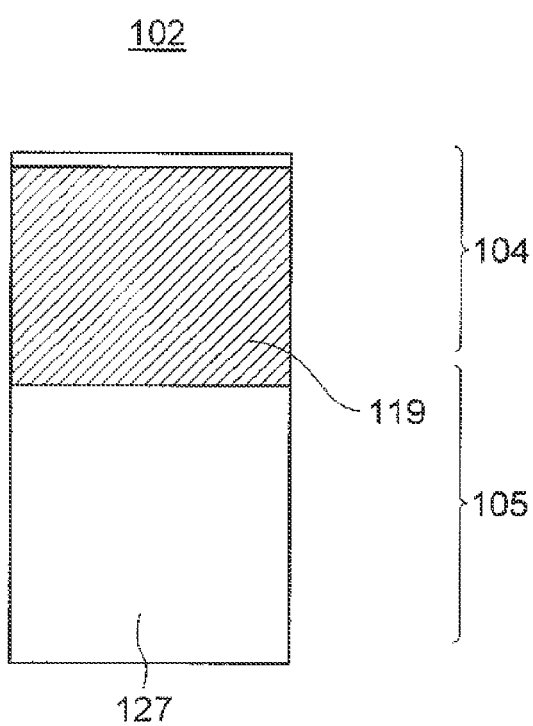
Figure 12:
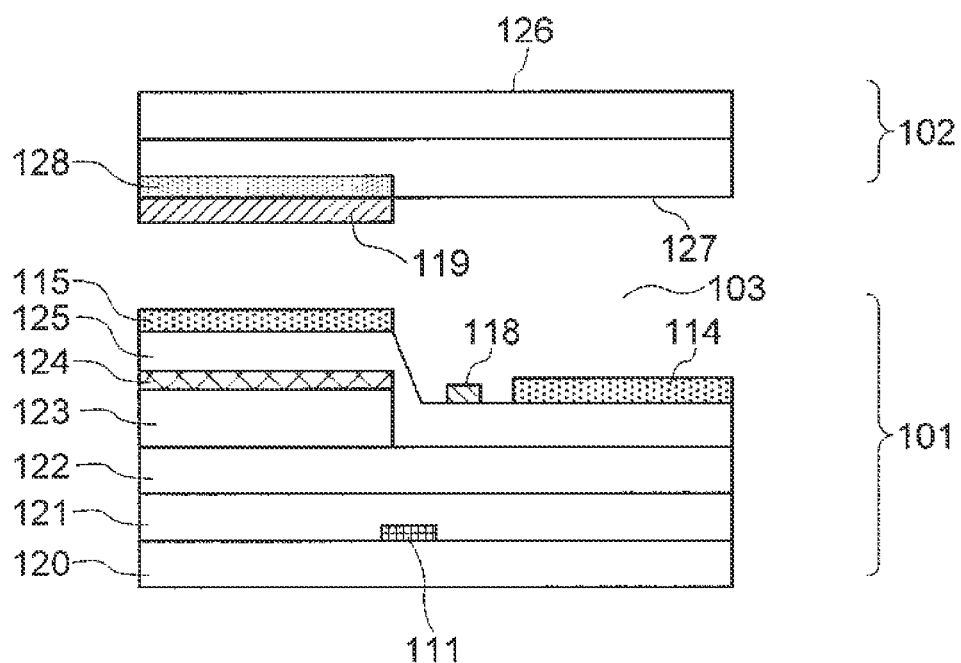
FIG. 12 is a sectional view of a unit pixel in the LCD unit of the fourth embodiment, showing a vicinity of the boundary between the reflective area and the transmissive area.

A LCD unit according to a fourth embodiment of the present invention will be described hereinafter. FIGS. 11A, 11B and 12 show the LCD unit of the present embodiment similarly to FIGS. 5A, 5B and 6, respectively. The LCD unit of the present embodiment is similar to the LCD unit of the first embodiment except that the scanning line 111 extends on the boundary between the reflective area 104 and the transmissive area 105, and has a width protruding toward the transmissive area 105 in an amount larger than the amount of protrusion toward the reflective area 104. This configuration is clearly shown in FIG. 13 or FIG. 14, which will be mentioned later. In this configuration, the reflective-area pixel electrode 115, scanning line 111, and transmissive-area common electrode 118 (or transmissive-area pixel electrode 114) extend parallel to one another and are arranged in this order as observed from the counter substrate 103. Although the end of reflective-area common electrode 119 is aligned with the end of reflective-area pixel electrode 115 in FIG. 12, the reflective-area common electrode 119 may have an extension protruding toward the transmissive area 105 beyond the reflective-area pixel electrode 115, similarly to FIG. 2.

In the present embodiment, the scanning line 111 is used as a reverse-tilt control member that controls the reverse tilt area in the vicinity of the boundary between the reflective area 104 and the transmissive area 105, and restricts the reverse tilt area to the vicinity of the counter substrate 102. The scanning line 111 applies a gate signal to the gate electrode of the TFT 116. The gate signal assumes a higher potential Vgon or a lower potential Vgoff, wherein the time length of Vgon is smaller than the time length of Vgoff, which plays a dominant role. The Vgoff is lower than the signal potential applied to any of the common electrode, pixel electrode and data line, and may be −15 volts, for example. This causes a potential difference between the scanning line 111 and any of the reflective-area pixel electrode 115, transmissive-area common electrode 118 and transmissive-area pixel electrode 114. The potential difference weakens the slanted electric field in the vicinity of the boundary, thereby suppressing the disturbance of orientation of the LC molecules caused by the slanted electric field.

Figure 13:
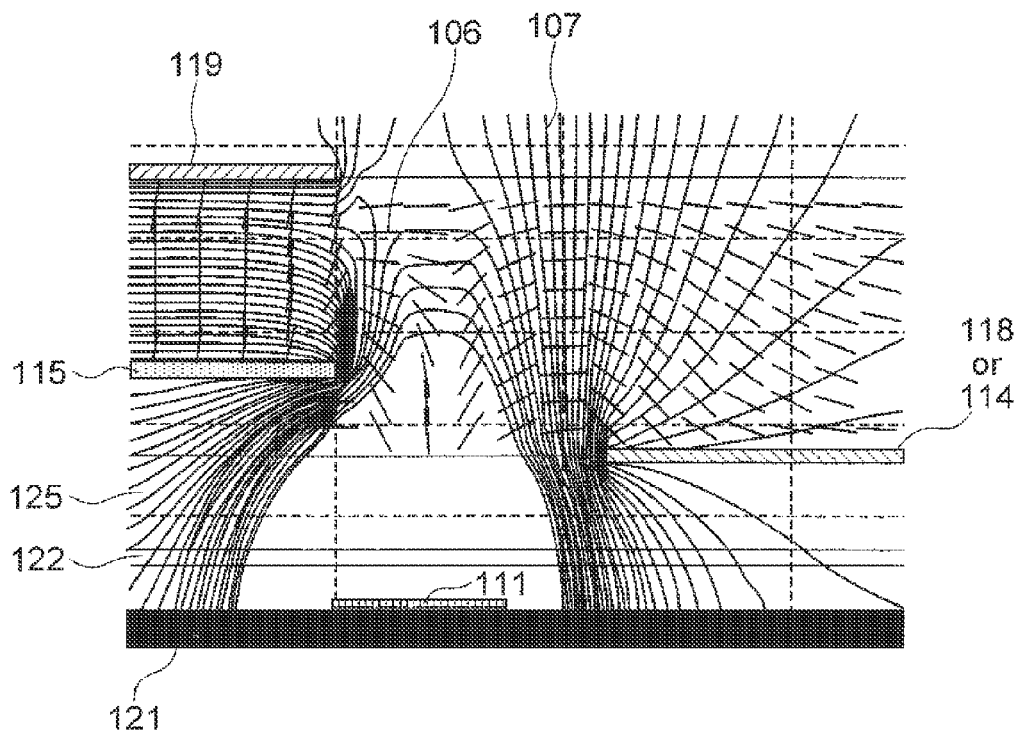
FIG. 13 is schematic diagram showing the electric field distribution obtained by simulation in the LCD unit of FIG. 12.

FIG. 13 shows results of simulation conducted for obtaining the electric field distribution in the LCD unit having the configuration shown in FIG. 12. The scanning line 111, which is provided on the boundary between the reflective area 104 and the transmissive area 105, generates a potential difference between the scanning line 111 and the reflective-area pixel electrode 115, or between the scanning line 111 and the transmissive-area common electrode 118 or transmissive-area pixel electrode 114 Thus, the scanning line 111 has a function similar to the function of the subsidiary electrode 129 (FIG. 6) in the second embodiment, and achieves a similar advantage. Although the scanning line 111 is used as the reverse-tilt control member in the present embodiment, the subsidiary electrode 129 may be provided instead, similarly to the second embodiment, to receive the gate signal from the scanning line 111 for achieving a similar advantage.

The potential difference caused by the scanning line 111 having a potential as low as −15V in the present embodiment is larger than the potential difference between the reflective-area pixel electrode 115 and the subsidiary electrode 129, and between the subsidiary electrode 129 and the transmissive-area common electrode 118 or transmissive-area pixel electrode 114 in the second embodiment. The potential difference in the present embodiment is also larger than the potential difference between the extension of the reflection film 124 and the reflective-area pixel electrode 115 and between the extension of the reflection film 124 and the transmissive-area common electrode 118 or transmissive-area pixel electrode 114 in the third embodiment. Therefore, the present embodiment achieves a higher effect for suppressing the slanted electric field as compared to those embodiments.

Figure 14:
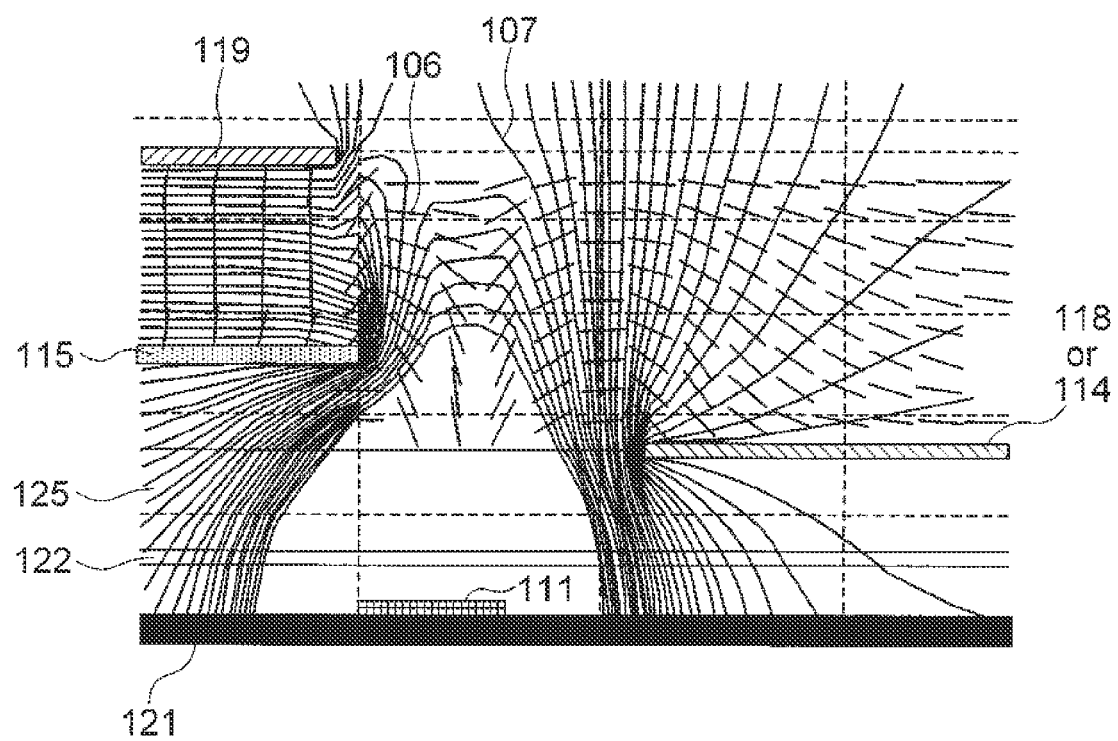
FIG. 14 is another schematic diagram showing the electric field distribution obtained by simulation in a LCD unit modified from the LCD unit of FIG. 12.
Figure 15:
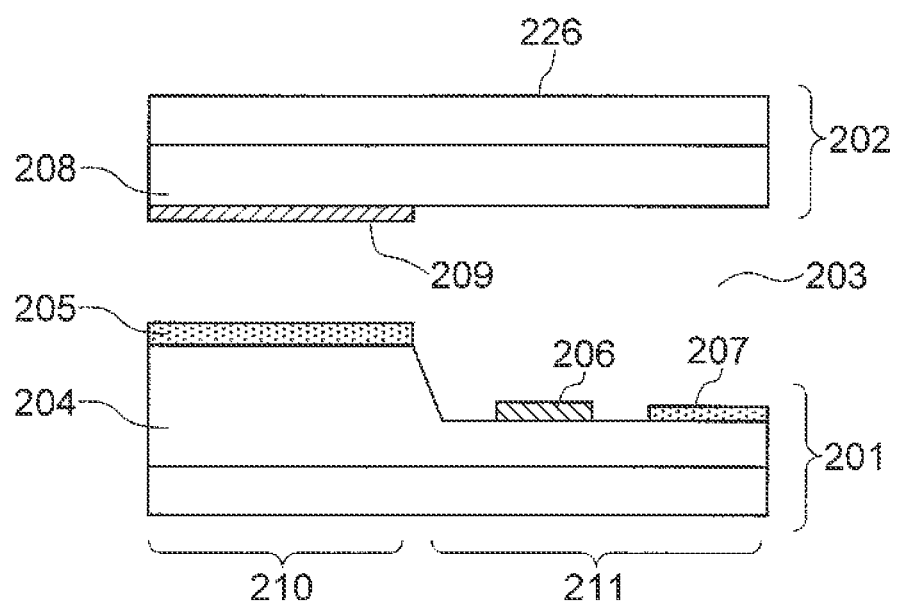
FIG. 15 is a sectional view of a unit pixel in a transflective LCD unit of the related art.

FIG. 14 shows results of simulation conducted for obtaining the electric field distribution in a modification of the present embodiment. The modification is such that the reflective-area common electrode 119 on the counter substrate 102 has no extension toward the transmissive area 105, and the reflective-area common electrode 119 has an extension protruding beyond the reflective-area pixel electrode 115 toward the reflective area 104 across the boundary. The higher effect of suppressing the slanted electric field in the present embodiment allows such a configuration wherein the reflective-area common electrode 119 has an extension protruding beyond the end of reflective-area pixel electrode 115 toward the transmissive area 105 across the boundary to effectively suppress the slanted electric field. Thus, even if a deviation between the counter substrate 102 and the TFT substrate 101 occurs during the bonding process and causes the reflective-area common electrode 119 to protrude toward the reflective area 104 beyond the end of reflective-area pixel electrode 115 across the boundary, the influence on the orientation of the LC molecules in the reflective area 104 by the slanted electric field can be more effective suppressed.

It is to be noted that although the reflective-area common electrode and the transmissive-area common electrode are applied with signals having an inversion relationship therebetween in the above embodiments, the reflective-area common electrode and the transmissive-area common electrode may be applied with the same signal so long as the reflective-area pixel electrode and the transmissive-area pixel electrode are applied with different signals. In such a case, a pair of switching devices are provided for respectively driving those pixel electrodes.

It is to be noted that although the transmissive-area pixel electrode and the transmissive-area common electrode extend in the direction normal to the boundary between the transmissive area 105 and the reflective area in the above embodiments, those electrodes may extend parallel to the boundary. The transmissive-area common electrode and transmissive-area pixel electrode may be made from a metal instead of the ITO.

While the invention has been particularly shown and described with reference to exemplary embodiment and modifications thereof, the invention is not limited to these embodiment and modifications. It will be understood by those of ordinary skill in the art that various changes in form and details may be made therein without departing from the spirit and scope of the present invention as defined in the claims.

What is claimed is:

1. A transflective liquid crystal display (LCD) unit comprising:
   a liquid crystal (LC) layer:
   first and second substrates sandwiching therebetween said LC layer to define an array of pixels in said LC layer, said pixels each including a reflective area and a transmissive area;
   an electrode assembly for driving said LC layer such that said LC layer in said reflective area is driven in a longitudinal-electric-field mode and said LC layer in said transmissive area is driven in a lateral-electric-field mode; and
   a reverse-tilt control member disposed in a vicinity of a boundary between said reflective area and said transmissive area for controlling a reverse tilt area in which a reverse tilt of LC molecules occurs in said LC layer,
   wherein said electrode assembly includes a reflective-area pixel electrode, a transmissive-area pixel electrode and a transmissive-area common electrode formed on said first substrate, and a reflective-area common electrode formed on said second substrate, and said reverse-tilt control member restricts said reverse tilt area within a vicinity of said second substrate, wherein said electrode assembly further comprises a subsidiary electrode formed on said first substrate and applied with a signal applied to said reflective-area common electrode, wherein said reflective-area common electrode overlaps a boundary line formed by a line between said reflective area and said transmissive area, and wherein said subsidiary electrode is formed independently from each of said reflective-area pixel electrode, said reflective-area common electrode, said transmissive-area pixel electrode and said transmissive-area common electrode, in an area between a first area where said reflective-area pixel electrode and said reflective area common electrode are formed and a second area where said transmissive-area pixel electrode and said transmissive-area common electrode are formed, on a planarization film on which both said transmissive area common electrode and said transmissive area pixel electrode are formed, whereby said reverse tilt area is controlled to be generated between the first area and the second area.

2. The transflective LCD unit according to claim 1, wherein said reflective-area common electrode and said transmissive-area common electrode are applied with different signals.

3. A terminal device including the transflective LCD unit according to claim 1.

* * * * *